(12) United States Patent
Kim

(10) Patent No.: US 10,860,166 B2
(45) Date of Patent: Dec. 8, 2020

(54) ELECTRONIC APPARATUS AND IMAGE PROCESSING METHOD FOR GENERATING A DEPTH ADJUSTED IMAGE FILE

(71) Applicant: SAMSUNG ELECTRONICS CO., LTD., Suwon-si (KR)

(72) Inventor: Hyun-jee Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 263 days.

(21) Appl. No.: 14/784,092

(22) PCT Filed: Mar. 23, 2015

(86) PCT No.: PCT/KR2015/002817
§ 371 (c)(1),
(2) Date: Oct. 13, 2015

(87) PCT Pub. No.: WO2015/142137
PCT Pub. Date: Sep. 24, 2015

(65) Prior Publication Data
US 2016/0054890 A1 Feb. 25, 2016

(30) Foreign Application Priority Data
Mar. 21, 2014 (KR) .................. 10-2014-0033708

(51) Int. Cl.
*G06F 3/048* (2013.01)
*G06F 3/0481* (2013.01)
(Continued)

(52) U.S. Cl.
CPC ...... *G06F 3/04815* (2013.01); *G06F 3/04842* (2013.01); *G06F 3/04845* (2013.01);
(Continued)

(58) Field of Classification Search
CPC ............ G06F 3/04815; G06F 3/04842; G06F 3/04845; G06F 3/00; G06T 19/20;
(Continued)

(56) References Cited

U.S. PATENT DOCUMENTS 9,001,151 B2 4/2015 Ha et al.
9,208,616 B2 12/2015 Kim
(Continued)

FOREIGN PATENT DOCUMENTS

JP 2013-171539 A 9/2013
KR 10-2013-0143271 A 12/2003
(Continued)

OTHER PUBLICATIONS

Search Report dated Jun. 12, 2015, issued by the International Searching Authority in counterpart International Application No. PCT/KR2015/002817 (PCT/ISA/210).
(Continued)

*Primary Examiner* — Jeanette J Parker
(74) *Attorney, Agent, or Firm* — Sughrue Mion, PLLC

(57) ABSTRACT

Provided is an image processing method including: displaying an image including a plurality of objects; receiving a selection of an object from among the plurality of objects; receiving a depth adjustment input; changing a depth of the selected object based on the depth adjustment input; generating a depth adjusted image file of the image based on the changed depth; and displaying a depth adjusted image based on the generated depth adjusted image file.

18 Claims, 17 Drawing Sheets

(51) Int. Cl.
  *H04N 13/00* (2018.01)
  *H04N 13/128* (2018.01)
  *G06F 3/0488* (2013.01)
  *H04N 13/271* (2018.01)
  *G06F 3/0484* (2013.01)
  *G06T 19/20* (2011.01)

(52) U.S. Cl.
  CPC .......... *G06F 3/04883* (2013.01); *G06T 19/20* (2013.01); *H04N 13/00* (2013.01); *H04N 13/128* (2018.05); *H04N 13/271* (2018.05); *G06T 2200/04* (2013.01)

(58) Field of Classification Search
  CPC ............ G06T 2200/04; H04N 13/0022; H04N 13/0271; H04N 13/00
  See application file for complete search history.

(56) References Cited

U.S. PATENT DOCUMENTS

| | | | |
|---|---|---|---|
| 2010/0166338 A1* | 7/2010 | Lee | H04N 13/178 382/285 |
| 2012/0019688 A1 | 1/2012 | Bugnariu et al. | |
| 2012/0069006 A1* | 3/2012 | Ishikawa | H04N 13/183 345/419 |
| 2012/0133645 A1* | 5/2012 | Jung | H04N 13/0011 345/419 |
| 2012/0162213 A1* | 6/2012 | Shim | G06F 3/04845 345/419 |
| 2012/0242660 A1* | 9/2012 | Kim | G06T 19/20 345/419 |
| 2013/0076746 A1* | 3/2013 | Chung | H04N 13/128 345/424 |
| 2013/0141430 A1* | 6/2013 | Joung | H04N 13/30 345/419 |
| 2013/0141435 A1* | 6/2013 | Cho | H04N 13/302 345/426 |
| 2013/0165186 A1* | 6/2013 | Choi | H04M 1/0266 455/566 |
| 2013/0222633 A1* | 8/2013 | Knight | H04N 5/23212 348/222.1 |
| 2015/0002724 A1* | 1/2015 | Chuang | H04N 5/23293 348/346 |
| 2015/0022631 A1* | 1/2015 | Chang | H04N 13/0033 348/43 |
| 2015/0116353 A1* | 4/2015 | Miura | G06T 11/60 345/632 |
| 2015/0373257 A1* | 12/2015 | Shirakawa | H04N 5/23216 348/333.12 |
| 2017/0031530 A1* | 2/2017 | Ikeda | G03B 17/54 |
| 2017/0188008 A1* | 6/2017 | Kim | H04N 13/0055 |
| 2019/0122385 A1 | 4/2019 | Yoo et al. | |

FOREIGN PATENT DOCUMENTS

| | | |
|---|---|---|
| KR | 10-2008-0096314 A | 10/2008 |
| KR | 10-2012-0072892 A | 7/2012 |
| KR | 10-2012-0108742 A | 10/2012 |
| KR | 10-2013-0068552 A | 6/2013 |
| KR | 10-2013-0074943 A | 7/2013 |
| KR | 10-2013-0082425 A | 7/2013 |

OTHER PUBLICATIONS

Written Opinion dated Jun. 12, 2015, issued by the International Searching Authority in counterpart International Application No. PCT/KR2015/002817 (PCT/ISA/237).

Office Action dated Apr. 23, 2020 by the Korean Intellectual Property Office in counterpart Korean Patent Application No. 10-2014-0033708.

Communication dated Oct. 5, 2020 issued by the Korean Patent Office in counterpart Korean Application No. 10-2014-0033708.

* cited by examiner

ELECTRONIC APPARATUS AND IMAGE PROCESSING METHOD FOR GENERATING A DEPTH ADJUSTED IMAGE FILE

CROSS-REFERENCE TO RELATED PATENT APPLICATIONS

The present application is a national stage application under 35 U.S.C. § 371 of International Application No. PCT/KR2015/002817, which claims priority from Korean Patent Application No. 10-2014-0033708, filed on Mar. 21, 2014 in the Korean Intellectual Property Office, the disclosures of which are incorporated by reference in their entireties.

BACKGROUND

1. Field

Exemplary embodiments relate to an electronic apparatus, an image processing method, and a computer-readable recording medium storing computer program codes that perform the image processing method.

2. Description of Related Art

Various apparatuses that capture and display a 3-dimensional (3D) image are being developed. A 3D image may be captured by using a depth camera or a stereo camera. A user may photograph a subject in 3D to give a realistic appearance. However, it is difficult for the user to change a 3D effect after the 3D image is captured.

SUMMARY

According to an aspect of an exemplary embodiment, there is provided an image processing method including: displaying an image comprising a plurality of objects; receiving a selection of an object from among the plurality of objects; receiving a depth adjustment input; changing a depth of the selected object based on the depth adjustment input; generating a depth adjusted image file of the image based on the changed depth; and displaying a depth adjusted image based on the generated depth adjusted image file.

The image processing method may further include generating a depth map comprising a plurality of depth values. The changing of the depth may include changing one or more depth values of the depth map corresponding to the selected object.

The image processing method may further include: capturing the image; and generating the depth map of the image; and storing the generated depth map.

The image processing method may further include recognizing the plurality of objects by analyzing the plurality of depth values of the depth map.

The image may include a left-eye image and a right-eye image, and the changing of the depth comprises changing an offset value of the selected object from the left-eye image and the right-eye image.

The image may be a moving image comprising a plurality of frames, and the changing of the depth may include changing the depth of the selected object in each of the plurality of frames.

The image processing method may further include receiving the image from a social network service (SNS); and uploading the depth adjusted image to the SNS.

The depth adjustment input may be an input of touching the selected object at two points, and the changing the depth of the selected object may be performed according to a change of a distance between the two points.

The image processing method may further include blurring an object having a depth different from the changed depth.

According to an aspect of another exemplary embodiment, there is provided an electronic apparatus including: a display configured to display an image comprising a plurality of objects; a user input configured to receive a selection of an object from among the plurality of objects and a depth adjustment command; an image processor configured to change a depth of the selected object based on the depth adjustment command and generate a depth adjusted image file; and a controller configured to control the display to display the image comprising the plurality of objects, recognize the selection of the object and the depth adjustment inputs, control the image processor to change the depth of the selected object and generate the depth adjusted image file, store the depth adjusted image file in the storage and control the display to display the depth adjusted image file.

The controller may be further configured to control the image processor to associate the image with a depth map comprising a plurality of depth values, and control the image processor to change one or more depth values of the depth map corresponding to the selected object.

The electronic apparatus may further include an imaging device, and the controller may be further configured to control the imaging device to capture the image, generate a depth map of the image and store the generated depth map in the storage.

The controller may be further configured to control the image processor to recognize the plurality of objects by analyzing the plurality of depth values of the depth map.

The image may include a left-eye image and a right-eye image, and the controller may be further configured to control the image processor to change an offset value of the selected object from the left-eye image and the right-eye image.

The image may be an anaglyph image, and the controller may be further configured to control the image processor to change an offset value of the selected object from the image.

The image may be a moving image comprising a plurality of frames, and the controller may be further configured to control the image processor to change the depth in each of the plurality of frames.

The electronic apparatus may further include a communicator configured to communicate with a server of a social network service (SNS), and the controller may be further configured to control the communicator to upload the depth adjusted image to the server.

The depth adjustment input may be an input of touching the selected object at two points, and the processor may be further configured to control the image processor to change the depth of the selected object according to a change of a distance between the two points.

The controller may be further configured to control the image processor to blur an object having a depth different from the changed depth.

According to an aspect of yet another exemplary embodiment, there is provided a computer-readable recording medium storing computer program codes, which when read and executed by a processor, perform an image processing method comprising: storing an image comprising a plurality of objects; displaying the stored image; receiving a selection of an object from among the plurality of objects; receiving a depth adjustment input; changing a depth of the selected object based on the depth adjustment input; generating a depth adjusted image file of the image based on the changed depth; storing the generated depth adjusted image file; and displaying a depth adjusted image based on the generated depth adjusted image file.

DETAILED DESCRIPTION OF EXEMPLARY EMBODIMENTS

Hereinafter, descriptions and accompanying drawings for explaining operations according to exemplary embodiments will be provided. Details that may be easily realized by one of ordinary skill in the art may not be described.

Also, the present specification and drawings are not intended to limit the present disclosure, and the scope of the present disclosure may be defined by claims below. Terms used herein should be construed as having meanings and concepts most related to the technical aspects of exemplary embodiments to most suitably represent the present disclosure. Expressions such as "at least one of," when preceding a list of elements, modify the entire list of elements and do not modify the individual elements of the list.

Hereinafter, one or more exemplary embodiments will be described with reference to accompanying drawings.

Figure 1:
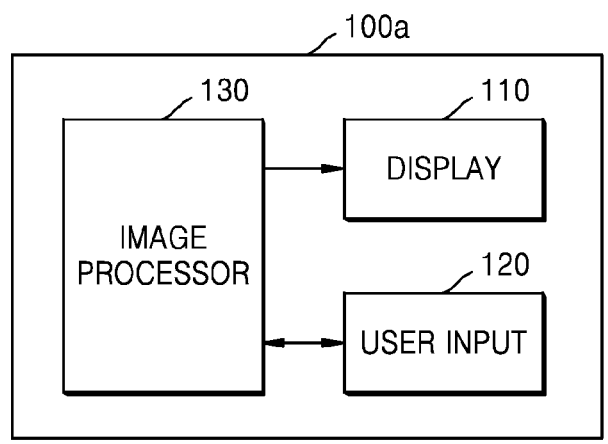
FIG. 1 is a diagram of a structure of an electronic apparatus according to an exemplary embodiment.

FIG. 1 is a diagram of a structure of an electronic apparatus 100a according to an exemplary embodiment.

The electronic apparatus 100a according to the current exemplary embodiment includes a display 110, a user input 120, and an image processor 130.

The electronic apparatus 100a according to the current exemplary embodiment may be realized as a smart phone, a tablet personal computer (PC), a mobile phone, a camera, a laptop, or a personal digital assistant (PDA).

The display 110 displays an image including a plurality of objects. The image is a 3-dimensional (3D) image, and is captured by photographing the plurality of objects. The display 110 may be realized by using, for example, a liquid crystal display (LCD) apparatus, an organic electroluminescent display (OLED) apparatus, a plasma display panel (PDP), or an electronic paper apparatus. The image displayed on the display 110 is processed by and output from the image processor 130. The image processor 130 may process the image to convert it to a format displayable on the display 110, for example, to an RGB image, and output the image to the display 110.

The object is defined and recognized by a certain region in the image, and may be a person, a thing, an animal, or a building. In order to recognize the object from the image, the image processor 130 may use a certain object recognizing algorithm, a depth map, or the like. According to an exemplary embodiment, the image processor 130 may recognize the objects from the image, determine a point where object selection is detected, and determine which object is selected. If the object selection is detected from a region where no object is arranged, the object selection may be ignored.

The user input 120 receives the object selection of selecting one of the objects.

According to an exemplary embodiment, the display 110 and the user input 120 may be integrally configured as a touch screen. In this case, the object selection may be a touch input selecting one of the objects. For example, a user may directly touch a region where an object to be selected is displayed to select one of the objects.

According to another exemplary embodiment, the user input 120 may be a mouse. According to an exemplary embodiment, the object selection may be a mouse input generated by clicking on one of the objects. For example, a user may locate a mouse pointer on an object to be selected and then click the mouse to select one of the objects. According to another exemplary embodiment, the object selection may be a mouse drag input of directly assigning a region to select one of the objects. For example, a user may drag a region around an object while clicking the mouse to select one of the objects.

When the object selection is received, the image processor 130 changes a depth of a selected object. A depth denotes a stereoscopic depth in the image. The changing of the depth of the selected object means that the image is processed such that the selected object appears to be closer or farther. Here, while expressing a depth, the term 'close' means that an object is close to a photographing apparatus and the term 'far' means that an object is far from a photographing apparatus. According to an exemplary embodiment, when the depth of the selected object is changed, the image processor 130 may output a result to the display 110 to be displayed.

Figure 2:
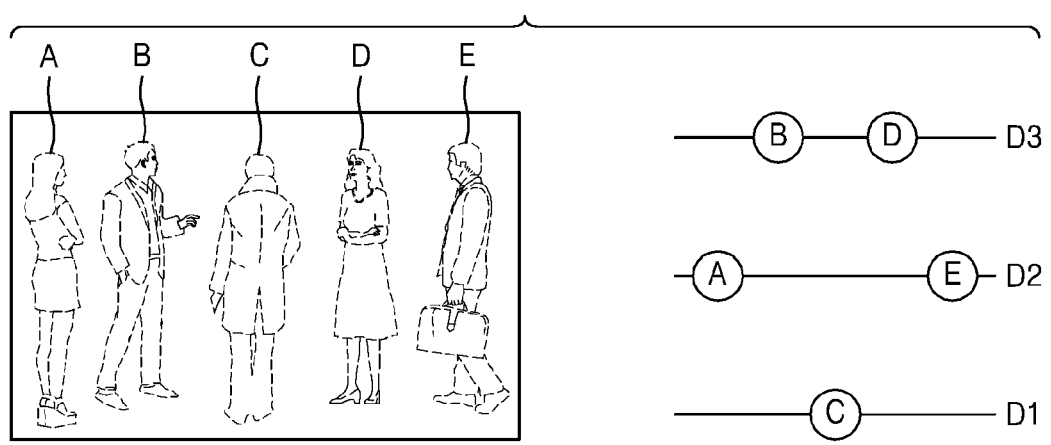
FIG. 2 is a diagram for describing an image according to an exemplary embodiment.

FIG. 2 is a diagram for describing an image according to an exemplary embodiment.

According to an exemplary embodiment, as shown in FIG. 2, the image includes five people A through E. The five people may have different depths in the image, as distances between the five people and a photographing apparatus may be different at a photographing time. For example, as shown in FIG. 2, the person C may have a depth of D1, as the person C is closest to the photographing apparatus, the people A and E may have a depth of D2, as the people A and E are second closest to the photographing apparatus, and the people B and D may have a depth of D3, as the people B and D are farthest from the photographing apparatus.

Figure 3:
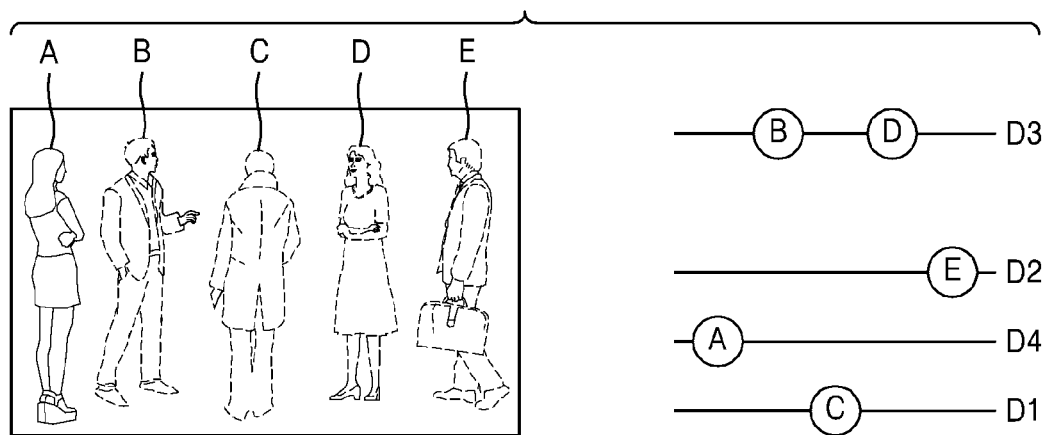
FIG. 3 is a diagram for describing an image of which a depth is changed, according to an exemplary embodiment.

FIG. 3 is a diagram for describing an image of which a depth is changed, according to an exemplary embodiment.

If a user selects the person A from among the five people, the image processor 130 may change the depth of the person A. For example, as shown in FIG. 3, the image may be processed such that the depth of the person A is changed from D2 to D4 and thus the person A is arranged closer.

According to an exemplary embodiment, the image processor 130 may change a size of a selected person when changing a depth of the selected person. For example, the image processor 130 may increase a size of the person A if the person A is moved closer, and may decrease the size of the person A if the person A is moved away.

According to an exemplary embodiment, the image processor 130 may change a depth of a selected object to match one of depths of the plurality of objects. For example, when the person A is selected from the image of FIG. 2, the image processor 130 may change the depth of the person A to D1 or D3.

According to another exemplary embodiment, the image processor 130 may change a depth of a selected person by a unit depth interval. A unit depth interval may be predetermined or assigned by a user.

According to an exemplary embodiment, the image processor 130 may process the image such that a focus is on a selected person. For example, when the person A is selected, the image may be processed such that a focus is on person A as shown in FIG. 3. Also, according to the current exemplary embodiment, the image processor 130 may process the image such that a person having the same depth as the selected person is also in focus.

The image processor 130 may compensate for blurriness of an object to be focused by, for example, increasing sharpness of the object such that the selected object appears in focus. According to another example, the image processor 130 may blur objects other than an object to be focused. A process performed on an object to be focused and a process performed on an object other than the object to be focused may be performed together or only one of the processes may be performed according to exemplary embodiments.

According to an exemplary embodiment, the image processor 130 may process the image such that a focus is on an object or a region selected by the user.

Figure 4:
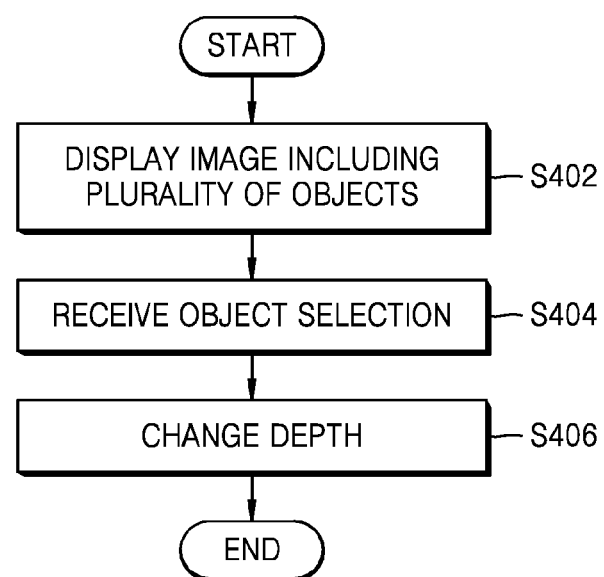
FIG. 4 is a flowchart of an image processing method according to an exemplary embodiment.

FIG. 4 is a flowchart of an image processing method according to an exemplary embodiment.

In the image processing method according to the current exemplary embodiment, first, an image including a plurality of objects is displayed in operation S402. The image including the plurality of objects is a 3D image captured by photographing the plurality of objects as described above.

Then, in the image processing method, an object selection for selecting one of the objects is received in operation S404. For example, the object selection may be a touch input for selecting one of the objects or a mouse input for selecting one of the objects.

Then, in the image processing method, a depth of the selected object is changed in operation S406.

Figure 5:
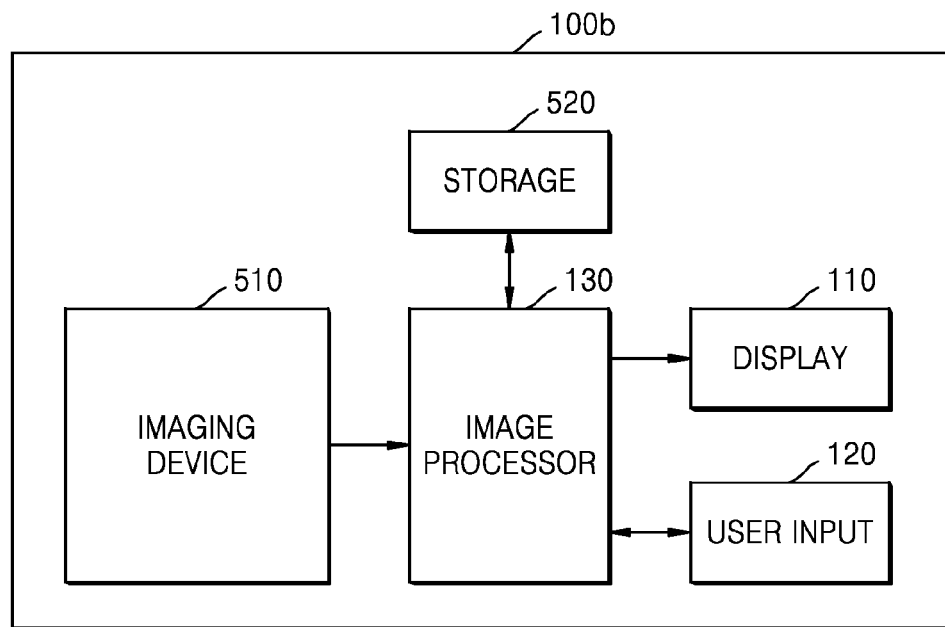
FIG. 5 is a diagram of a structure of an electronic apparatus according to another exemplary embodiment.

FIG. 5 is a diagram of a structure of an electronic apparatus 100b according to another exemplary embodiment.

The electronic apparatus 100b according to the current exemplary embodiment includes the display 110, the user input 120, the image processor 130, a imaging device 510, and a storage 520.

The imaging device 510 photographs a plurality of objects and generates an image including the plurality of objects. The imaging device 510 generates the image by photoelectric-converting incident light. The imaging device 510 may include a lens, an iris, and an image pickup device. The imaging device 510 according to the current exemplary embodiment may capture a 3D image. For example, the imaging device 510 may be a depth camera or a stereo camera.

The depth camera generates an imaging signal of a subject while generating depth information of the subject. The depth camera generates an image from the imaging signal and then matches and outputs the image and the depth information. The depth information, for example, may be generated in the form of a depth map including a depth value of each location.

The stereo camera includes a left-eye image generating optical system and a right-eye image generating optical system. The left-eye image generating optical system generates a left-eye image and the right-eye image generating optical system generates a right-eye image. The left-eye image and the right-eye image form a 3D image. The 3D image is reproduced by alternately displaying the left-eye image and the right-eye image. Each of the left-eye image generating optical system and the right-eye image generating optical system may include a lens and an iris. Also, the left-eye image generating optical system and the right-eye image generating optical system may include separate image pickup devices or one common image pickup device, according to exemplary embodiments.

According to an exemplary embodiment, an anaglyph may be generated by using the left-eye image and the right-eye image captured by the stereo camera. According to an anaglyph method, a 3D image is realized by using a color difference. For example, the left-eye image is changed to blue and the right-eye image is changed to red, and then the left- and right-eye images may be combined to generate the anaglyph. In this case, glasses having a blue filter for a left eye and a red filter for a right eye may be used to view the anaglyph, thereby obtaining a 3D effect.

The image processor 130 generates a preview image from the image generated by the imaging device 510, and outputs the preview image to the display 110. The display 110 displays the preview image.

The user input 120 may receive a control signal for instructing photographing, such as a shutter release signal, and a selection signal for selecting one of the plurality of objects.

According to an exemplary embodiment, the image processor 130 may change a depth of an object selected from the preview image. According to an exemplary embodiment, when object selection is detected from one frame of the preview image, a changed depth of a selected object may be reflected to frames subsequent to the one frame. Also, when a captured image is generated, for example in response to an input shutter release signal, while the preview image is displayed, the image processor 130 may store the captured image reflecting the changed depth. Also, the image processor 130 may generate an image file including the captured image and store the image file in the storage 520.

According to another exemplary embodiment, the image processor 130 may change a depth of a selected object based on a quick-view image displayed after a shutter release signal is input. The quick-view image is a captured image displayed while being temporarily stored before an image file is generated, after the captured image is generated in response to a shutter release signal. According to the current exemplary embodiment, a user may select an object from the quick-view image and change a depth of the selected object. The captured image may be converted to and stored as reflecting the changed depth.

The storage 520 stores the image file generated by the image processor 130. The storage 520, for example, may be a flash memory, a solid state drive (SSD), a secure digital (SD) card, a micro SD card, a smart media card (SMC), a compact flash (CF) card, a memory stick, or a multimedia picture (extreme digital picture) card.

Figure 6:
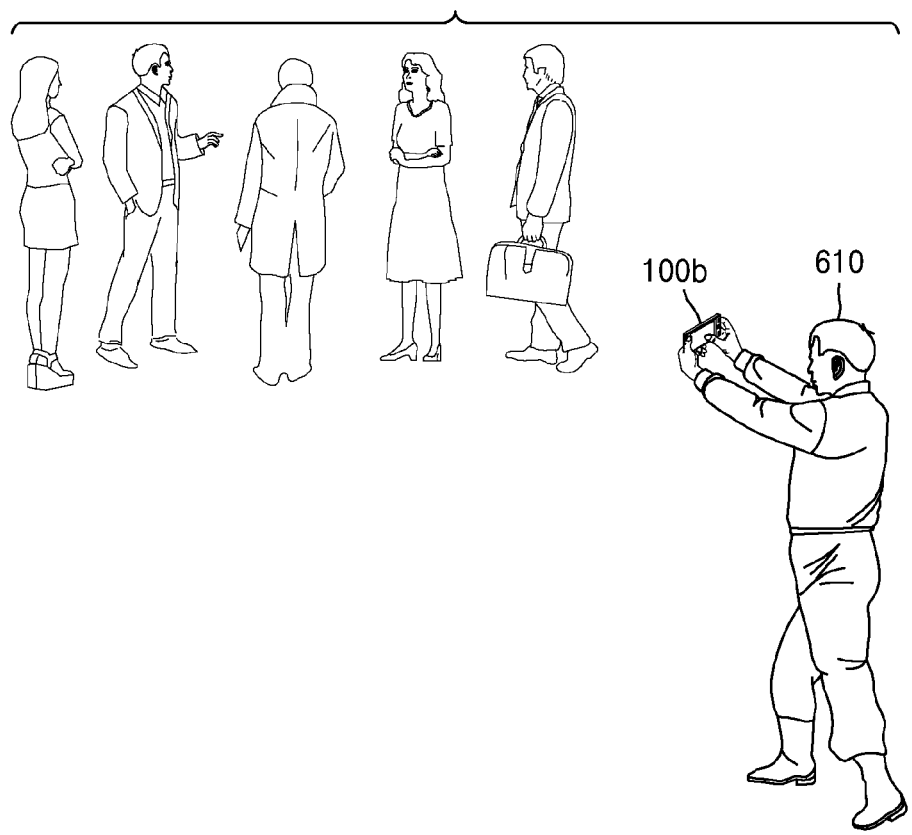
FIG. 6 is a diagram for describing a process of capturing an image, according to another exemplary embodiment.

FIG. 6 is a diagram for describing a process of capturing an image, according to another exemplary embodiment.

According to the current exemplary embodiment, as shown in FIG. 6, while photographing a plurality of objects (for example, people) having different distances from the electronic apparatus 100b, a photographer 610 may change depths of the plurality of objects during a photographing process or a quick-view checking process, and then store an image having changed depths. Accordingly, a user may adjust depths of subjects during a photographing process without having to perform a separate post-process, and generate an image file including an image in which the depths are adjusted.

Figure 7:
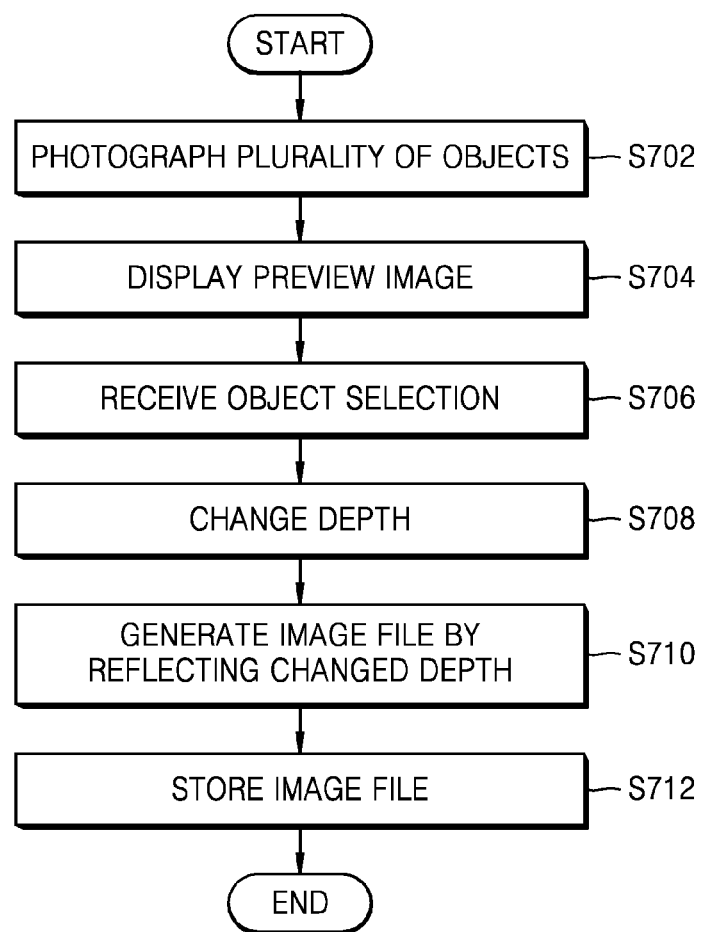
FIG. 7 is a flowchart of an image processing method according to another exemplary embodiment.

FIG. 7 is a flowchart of an image processing method according to another exemplary embodiment.

In the image processing method, first, a plurality of objects are photographed in operation S702. The photographing may be performed to include 3D information. For example, the photographing may be performed by using a depth camera or a stereo camera.

Then, a preview image is generated from a captured image, in operation S704.

In the image processing method, object selection for selecting one of the plurality of objects is received while a preview image or a quick-view image including the plurality of objects is displayed, in operation S706.

Then, in the image processing method, a depth of a selected object is changed in operation S708. An image file including the captured image is generated and stored by reflecting the changed depth therein, in operations S710 and S712.

Figure 8:
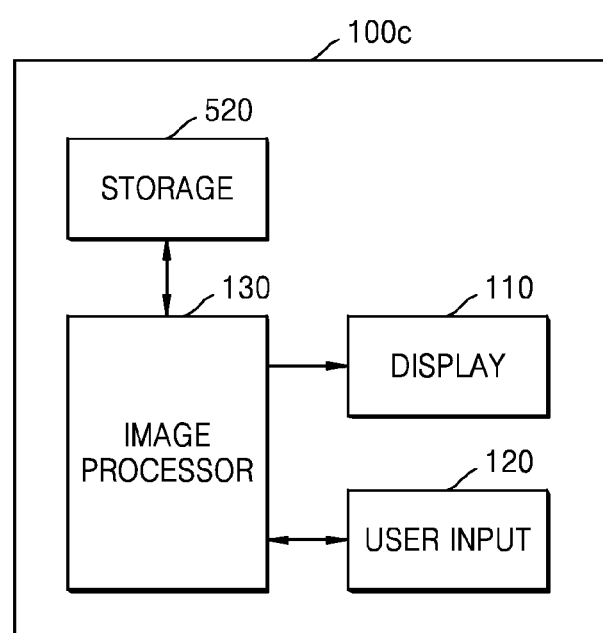
FIG. 8 is a diagram of a structure of an electronic apparatus according to another exemplary embodiment.

FIG. 8 is a diagram of a structure of an electronic apparatus 100c according to another exemplary embodiment.

The electronic apparatus 100c according to the current exemplary embodiment includes the display 110, the user input 120, the image processor 130, and the storage 520.

The storage 520 stores at least one image file. The image file includes a 3D image obtained by photographing a plurality of objects.

The image processor 130 reproduces the image file stored in the storage 520 to be displayed on the display 110. The image processor 130 may decode the image file to reproduce an image stored in the image file. If the image includes a depth map, the image processor 130 may reproduce the image by applying a 3D effect to the image by using image data of the image file and the depth map. If the image includes a left-eye image and a right-eye image, the image processor 130 reproduces the image by alternately displaying the left-eye image and the right-eye image. If the image is an anaglyph, a user may wear anaglyph 3D glasses and view the image, thereby viewing the image with a 3D effect.

Figure 9:
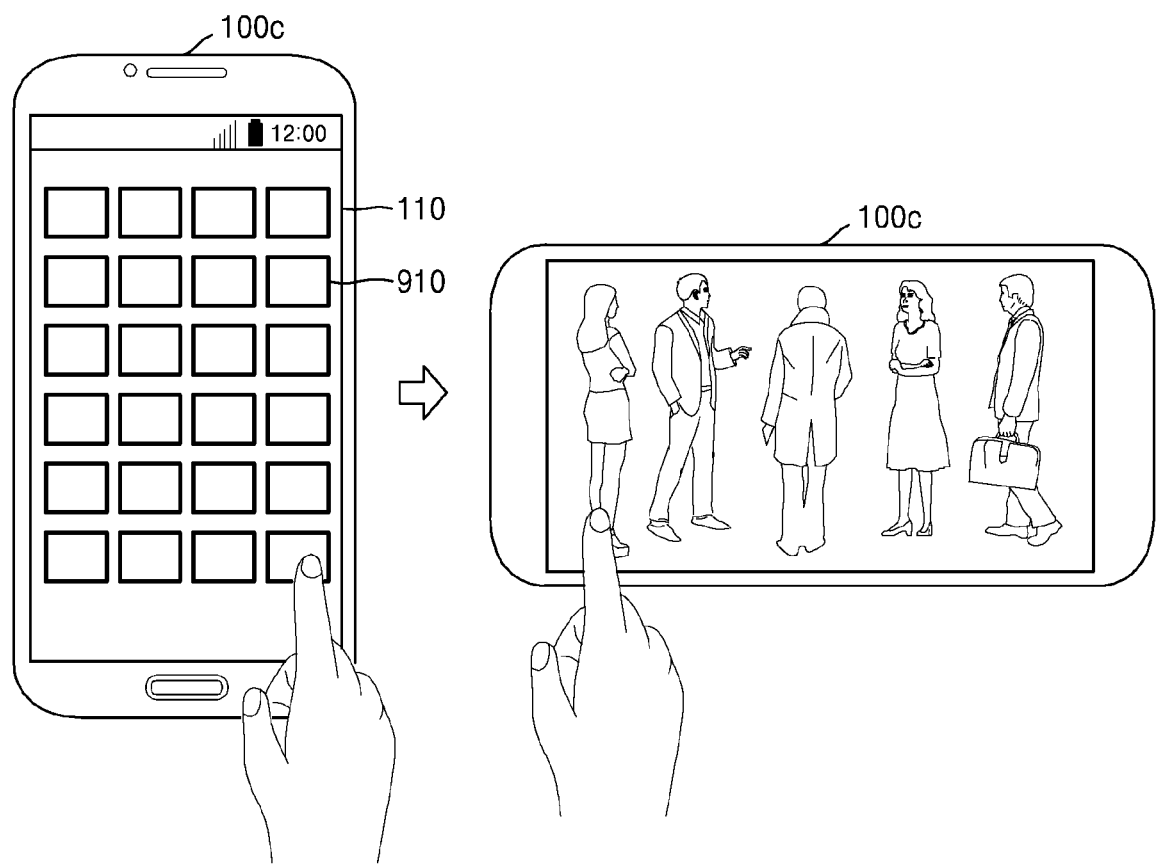
FIG. 9 is a diagram for describing reproducing of an image, according to an exemplary embodiment.

FIG. 9 is a diagram for describing reproducing of an image, according to an exemplary embodiment.

The electronic apparatus 100c according to the current exemplary embodiment may provide a reproducing function for reproducing image files stored in the storage 520. For example, the reproducing function may be performed by using an application, such as a gallery or a photo album. As another example, the reproducing function may be provided as a function of various applications. Also, according to the current exemplary embodiment, an application providing a function of changing a depth of a selected object may be separately provided.

According to an exemplary embodiment, when the reproducing function is performed, the image processor 130 displays thumbnail images 910 indicating the image files stored in the storage 520 on a screen. According to an exemplary embodiment, in the reproduction function, the image processor 130 may classify photos into groups (for example, albums, folders, or categories), and then display, on the screen, the thumbnail images 910 of image files belonging to a group selected by a user.

When the user selects one thumbnail image from the screen on which the thumbnail images 910 are displayed, as shown in FIG. 9, the image processor 130 reproduces an image file corresponding to the selected thumbnail image to be displayed on the display 110. While the image file is displayed on the display 110, the user may select one object as shown in the right diagram of FIG. 9 and change a depth of the selected object According to another exemplary embodiment, the image file may be reproduced by one of various forms. For example, while one image file is being reproduced and displayed, a user may input a touch input of dragging a screen such that the image processor 130 reproduces another image file stored in the storage 520. As another example, an image may be reproduced by one of various methods, such as selecting and enlarging an image displayed on a certain application, or opening a certain image file from a certain application.

Figure 10:
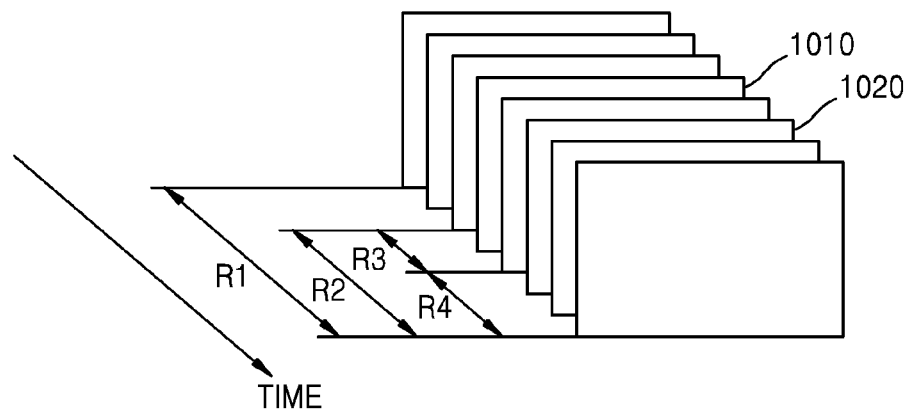
FIG. 10 is a diagram for describing a process of changing a depth of an object, according to another exemplary embodiment.

FIG. 10 is a diagram for describing a process of changing a depth of an object, according to another exemplary embodiment.

According to the current exemplary embodiment, the image is a 3D moving image and a depth of a selected object may be changed upon receiving object selection from a user selecting one of a plurality of objects included in the 3D moving image while reproducing the 3D moving image. The 3D moving image may be, for example, a streaming moving image transmitted through a stored 3D moving image file, a broadcast signal, or a streaming service.

As shown in FIG. 10, a moving image includes a plurality of frames. According to the current exemplary embodiment, when a user inputs object selection for selecting one of a plurality of objects displayed on a frame 1010 from among the plurality of frames while the frame 1010 is being reproduced, the image processor 130 may change a depth of the selected object. According to the current exemplary embodiment, the changed depth may be applied to not only the frame 1010 from which the object selection is detected, but also to other frames. The changing of the depth during reproduction may be performed while reproducing each frame.

According to an exemplary embodiment, when the object selection is detected while reproducing the moving image, the changed depth of the selected object may be applied to all frames R2 after the frame 1010 from which the object selection is detected. In this case, the frames R2 after the frame 1010 from which the object selection is detected are displayed with the changed depth of the selected object. According to an exemplary embodiment, a new moving image file applied with the changed depth may be generated and stored, or a moving image file being currently reproduced may be updated with the changed depth. In this case, when the new moving image file or the updated moving image file are reproduced afterwards, the new moving image file or the updated moving image file is reproduced with the changed depth of the selected object after the frame 1010 from which the object selection is detected.

According to another exemplary embodiment, when the object selection is detected while reproducing the moving image, the changed depth of the selected object may be applied to all frames R1 belonging to the moving image file.

If a plurality of object selections are detected while reproducing the moving image, according to an exemplary embodiment, a depth of selected object may be changed from a frame from which object selection is detected, whenever the object selections are detected. For example, when object selection is detected from the first frame 1010, a depth of a selected object is changed from the first frame 1010 or a frame after the first frame 1010. Then, when object selection is again detected from a second frame 1020, a depth of a selected object is changed from the second frame 1020 from which the object selection is detected or a frame after the second frame 1020. As such, when the plurality of object selections are detected while reproducing the moving image, frames R3 between the first frame 1010 and the second frame 1020 are displayed with the changed depth of the selected object of the first frame 1010, and frames R4 after the second frame 1020 are displayed with the changed depth of the selected object of the second frame 10102. If an image file is generated or updated by applying the changed depth, and the generated or updated image file is reproduced, the frames R3 and the frames R4 are reproduced with the changed depths described above.

According to the current exemplary embodiment, a user may select an object the user wishes to emphasize while reproducing a moving image, and view the moving image while the object is being emphasized. For example, the user may select his/her favorite actor while watching a TV series, and then watch the TV series while the favorite actor is emphasized. As another example, the user may select him/herself while reproducing a moving image of him/herself, and watch the moving image while him/herself is emphasized.

According to an exemplary embodiment, a depth map of each of the plurality of frames may be stored or transmitted together with the plurality of frames, and the moving image may be reproduced by applying a 3D effect to the plurality of frames by using the depth maps. In this case, when object selection of selecting an object is detected while reproducing the moving image, the moving image may be reproduced by applying a changed depth to depth maps of frames of which a depth of the selected object is to be changed.

According to another exemplary embodiment, each of the plurality of frames includes a left-eye image and a right-eye image. The image processor 130 may reproduce the moving image by applying a 3D effect by alternately displaying the left-eye image and the right-eye image of the plurality of frames. In this case, when an object selection is detected while reproducing the moving image, the moving image may be reproduced after recognizing a selected object in frames of which a depth of the selected object is to be changed and then changing an offset between the selected objects in the frames. A process of changing the offset in the left-eye image and the right-eye image will be described in detail later.

Figure 11:
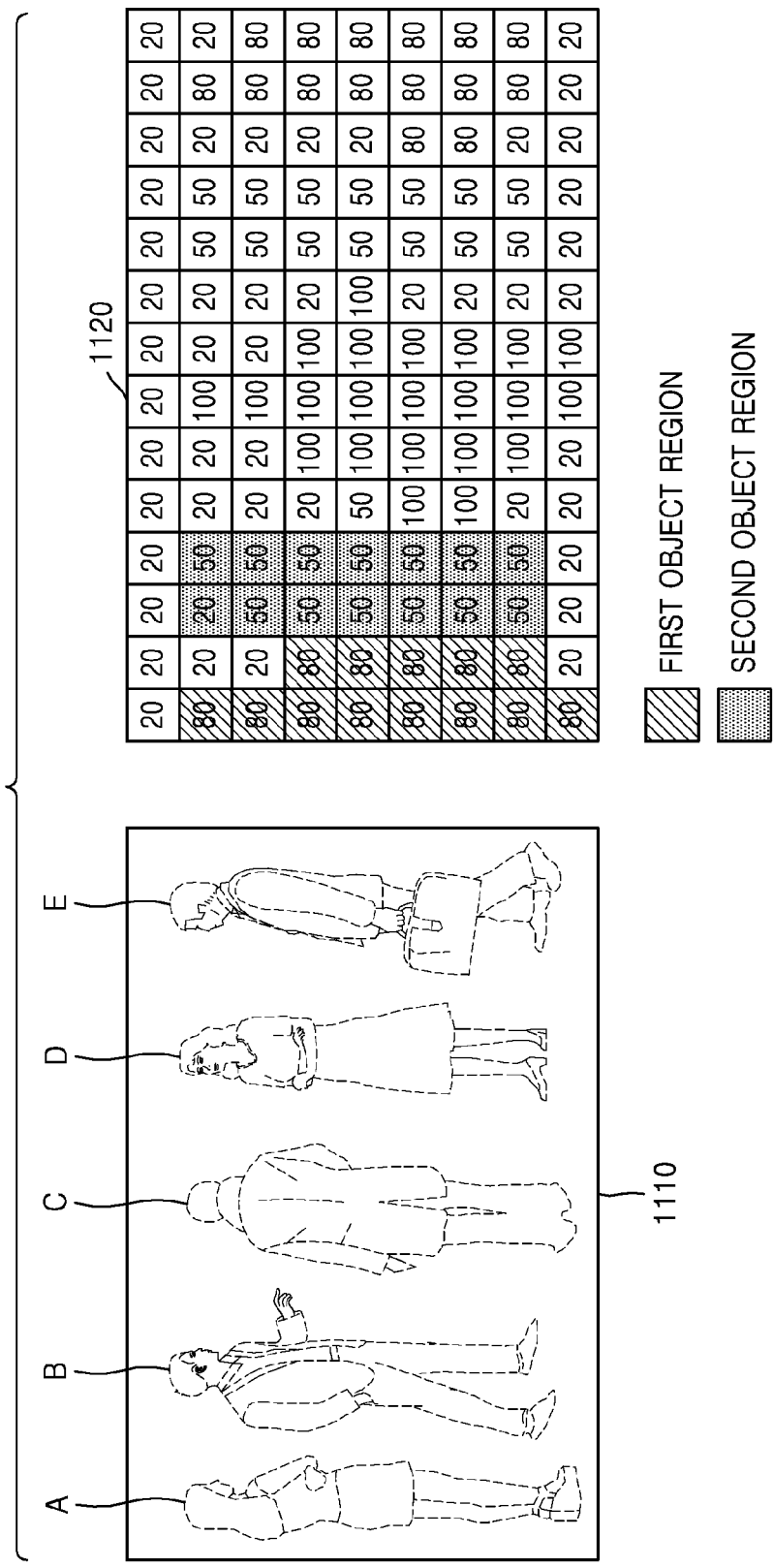
FIG. 11 is a diagram of a 3-dimensional (3D) image according to an exemplary embodiment.

FIG. 11 is a diagram of a 3D image according to an exemplary embodiment.

According to an exemplary embodiment, the 3D image may include an image 1110 and a depth map 1120.

For example, the 3D image according to the current exemplary embodiment may be an image obtained by generating the image 1110 and the depth map 1120 during photographing by using a depth camera and storing the image 1110 and the depth map 1120 together. The depth camera may generate the depth map 1120 by detecting depths of objects.

As another example, the 3D image according to the current exemplary embodiment may be an image obtained by capturing a left-eye image and a right-eye image by using a stereo camera, generating the depth map 1120 by using the left-eye image and the right-eye image, and then storing the depth map 1120 and the image 1110 that is one of the left-eye image and the right-eye image together. If the depth map 1120 is generated based on the left-eye image, the left-eye image and the depth map 1120 are stored, and if the depth map 1120 is generated based on the right-eye image, the right-eye image and the depth map 1120 are stored.

The depth map 1120 includes a depth value of each location. A depth value may be expressed by a number as shown in FIG. 11. For example, a depth value may be high when a distance between an object and a photographing apparatus is close, and a depth value may be low when a distance between an object and a photographing apparatus is far. One unit of the depth map 1120 may correspond to a pixel of the image 1110 or a plurality of pixels of the image 1110 according to exemplary embodiments.

According to the current exemplary embodiment, the image processor 130 may recognize objects included in an image by using the depth map 1120. For example, the image processor 130 may determine that a region including adjacent units having similar depth values corresponds to one object. When depth values have a difference lower than or equal to a reference value, the depth values may be determined to be similar depth values. Referring to FIG. 11, a left region having depth values of 80 includes adjacent units having similar depth values, and the image processor 13 may determine that the left region having the depth values of 80 may correspond to a first object region. The first object region corresponds to a person A in the image 1110. Also, a left region having depth values of 50 includes adjacent units having similar depth values, and the image processor 130 may determine that the left region having the depth values of 50 correspond to a second object region. The second object region corresponds to a person B in the image 1110.

Figure 12:
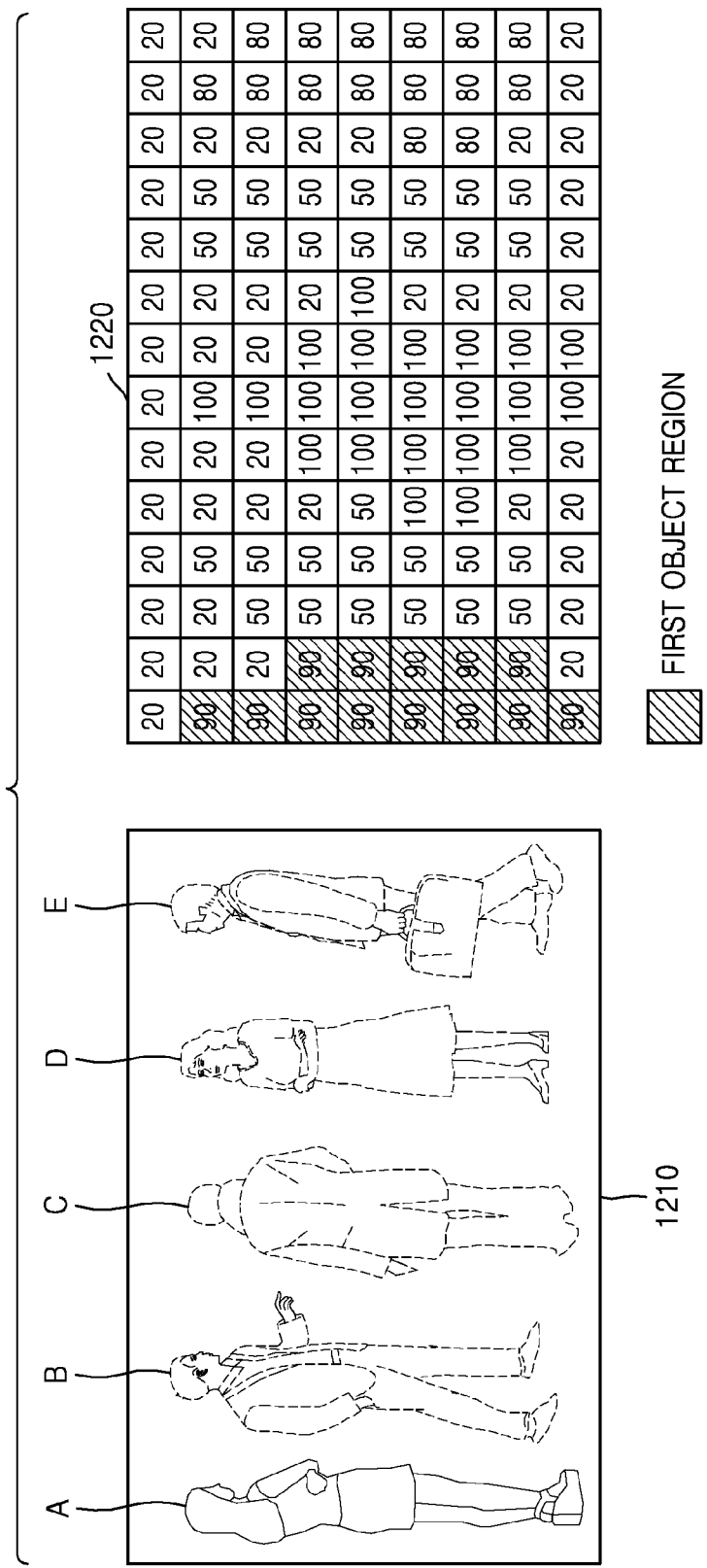
FIG. 12 is a diagram illustrating a result of changing a depth of an image, according to an exemplary embodiment.

FIG. 12 is a diagram illustrating a result of changing a depth of an image, according to an exemplary embodiment.

If a user selects the person A while the image 1110 of FIG. 11 is displayed, the image processor 130 changes a depth of the person A. According to the current exemplary embodiment, the image processor 130 changes a depth of a selected object by changing a depth value of a depth map 1220 of an object corresponding to the selected object to generate image 1210. For example, the first object region of the depth map 1120 of FIG. 11 has a value of 80, and when the person A is selected while the image 1110 of FIG. 11 is displayed, a depth value may be changed to 90 in the first object region corresponding to the person A.

Figure 13:
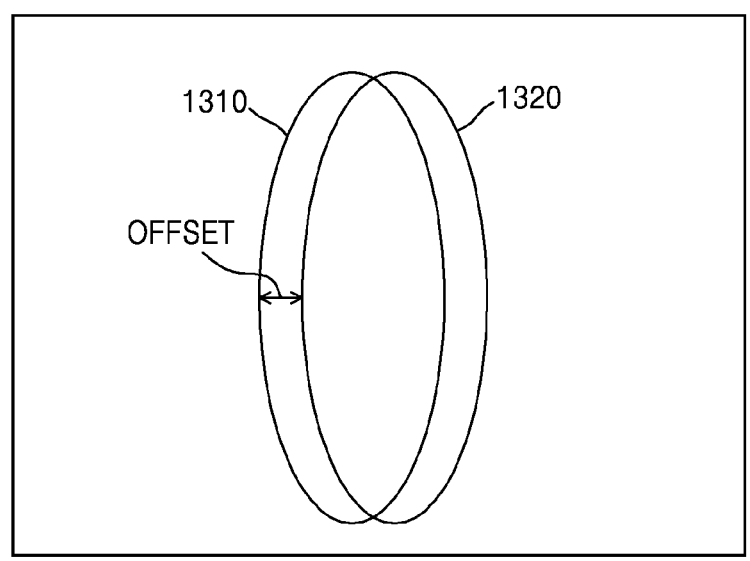
FIG. 13 is a diagram for describing a process of changing a depth of a selected object, according to an exemplary embodiment.

FIG. 13 is a diagram for describing a process of changing a depth of a selected object, according to an exemplary embodiment.

According to an exemplary embodiment, the image is a 3D image including a left-eye image and right-eye image. At least one object included in the image is disposed in the left-eye image and the right-eye image with an offset value, and the offset value varies according to a depth of an object. If the left-eye image and the right-eye image overlap with each other, the same objects 1310 and 1320 may be misaligned as shown in FIG. 13. When the left-eye image and the right-eye image overlap each other as shown in FIG. 13, a location difference between the same objects 1310 and 1320 in a transverse direction is referred to as an offset value OFFSET.

According to an exemplary embodiment, when the image is the 3D image including the left-eye image and the right-eye image, the image processor 130 changes the depth of the selected object by changing the offset value of the selected object. For example, the offset value is high when the object is close and the offset value is low when the object is far.

According to another exemplary embodiment, the image processor 130 may change the image including the left-eye image and the right-eye image to an anaglyph and display the anaglyph. When the image is reproduced in an anaglyph method, the left-eye image may be converted to blue, the right-eye image may be converted to red, and then the left-eye image and the right-eye image are projected on one screen. According to exemplary embodiments, a display image in which the converted left-eye image and the converted right-eye image are combined may be generated. Each object in the display image may have the offset value OFFSET according to a depth.

According to the current exemplary embodiment, the image processor 130 changes the offset value OFFSET of the selected object in the image displayed in the anaglyph method. For example, a location of the selected object in the left-eye image and the right-eye image is shifted to change the depth of the selected object. As another example, the depth of the selected object may be changed by changing the offset value (OFFSET) of the selected object from the display image in which the left-eye image and the right-eye image are combined.

If the image is an image included in an image file composed and stored in the anaglyph method, the image processor 130 may recognize the selected object from the image stored in the image file and change the offset value OFFSET of the selected object to change the depth of the selected object.

Figure 14:
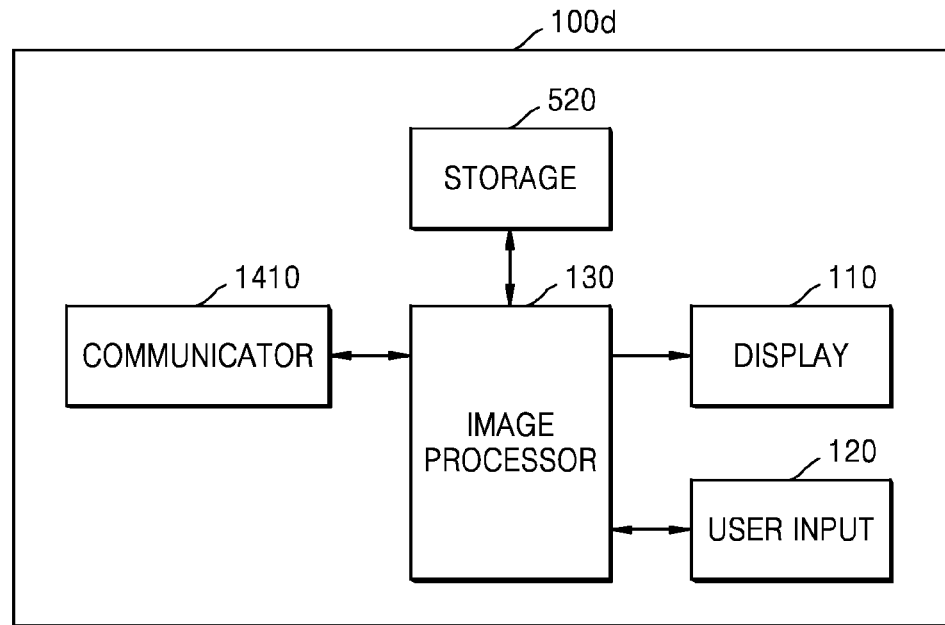
FIG. 14 is a diagram of a structure of an electronic apparatus according to another exemplary embodiment.

FIG. 14 is a diagram of a structure of an electronic apparatus 100*d* according to another exemplary embodiment.

The electronic apparatus 100*d* according to the current exemplary embodiment includes the display 110, the user input 120, the image processor 130, the storage 520, and a communicator 1410.

The communicator 1510 communicates with an external apparatus through a network. The communicator 1410 communicates with the external apparatus wirelessly or via wires. Examples of the external apparatus may include a social network service (SNS) server, a service server, a cloud service server, a smart phone, a tablet PC, a mobile phone, a laptop, and a PDA.

According to an exemplary embodiment, the image processor 130 displays an image received through the communicator 1410 on the display 110, receives a user selection, and changes a depth of a selected object.

Figure 15:
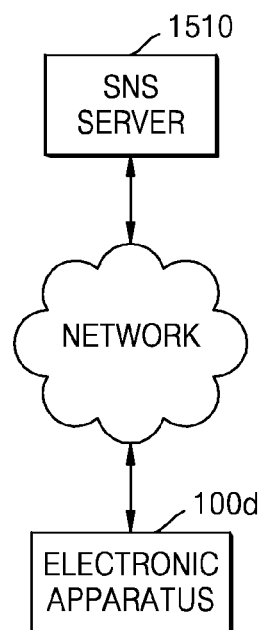
FIG. 15 is a diagram of a social network service (SNS) server and the electronic apparatus, according to another exemplary embodiment.

FIG. 15 is a diagram of an SNS server 1510 and the electronic apparatus 100*d*, according to another exemplary embodiment.

According to the current exemplary embodiment, the electronic apparatus 100*d* may communicate with a server, such as SNS server 1510, through a network. The electronic apparatus 100*d* may perform a social network service provided by the SNS server 1510 by connecting to the SNS server 1510 through the network. For example, the electronic apparatus 100*d* may upload an image to the SNS server 1510 or download an image from the SNS server 1510.

Figure 16:
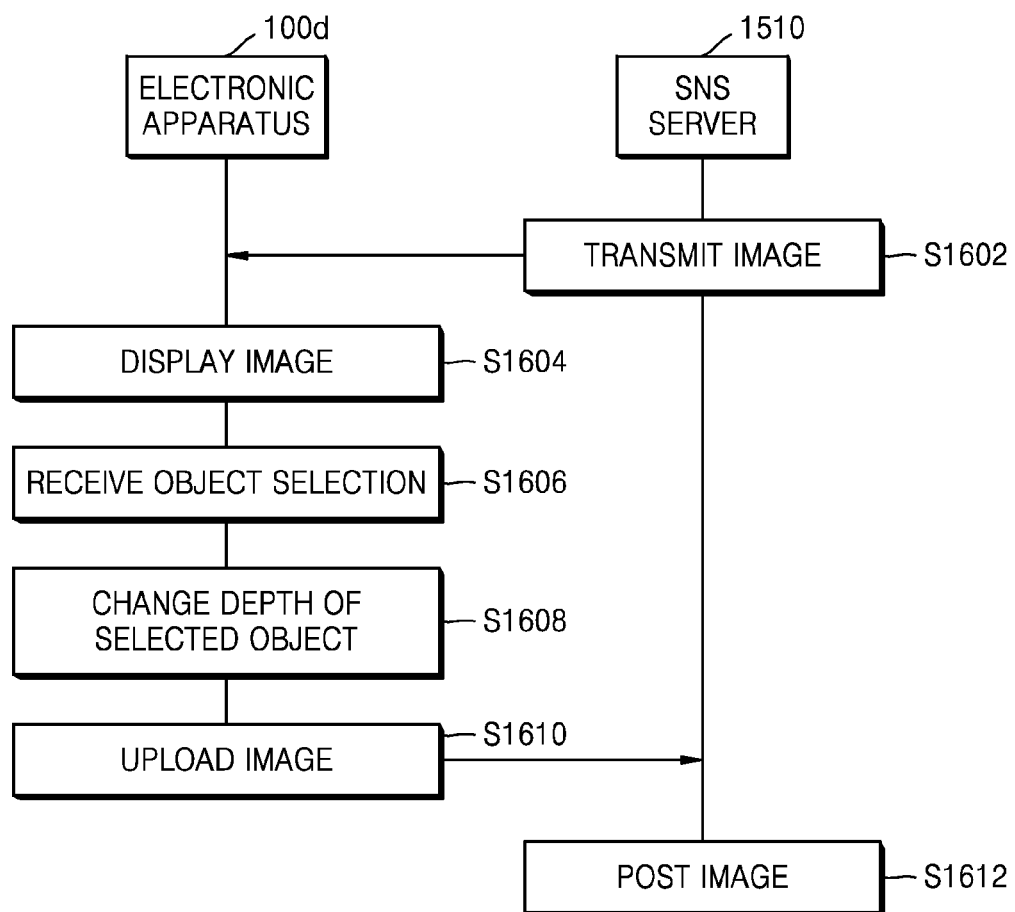
FIG. 16 is a flowchart illustrating operations of the electronic apparatus and the SNS server, according to another exemplary embodiment.

FIG. 16 is a flowchart illustrating operations of the electronic apparatus 100*d* and the SNS server 1510, according to another exemplary embodiment.

According to the current exemplary embodiment, the image processor 130 may display an image downloaded from the SNS server 1510, receives object selection, and change a depth of a selected object. First, the SNS server 1510 transmits an image stored in the SNS server 1510 to the electronic apparatus 100*d*, in operation S1602. The electronic apparatus 100*d* receives the image transmitted from the SNS server 1510.

The electronic apparatus 100*d* displays the received image on the display 110 in operation S1604, and receives the object selection in operation S1606 while the image is displayed. Then, the electronic apparatus 100*d* changes a depth of the selected object in operation S1608, and then uploads the image in which the depth of the selected object is changed, in operation S1610. The SNS server 1510 receives the image in which the depth is changed, and posts the received image on an SNS page in operation S1612.

Figure 17:
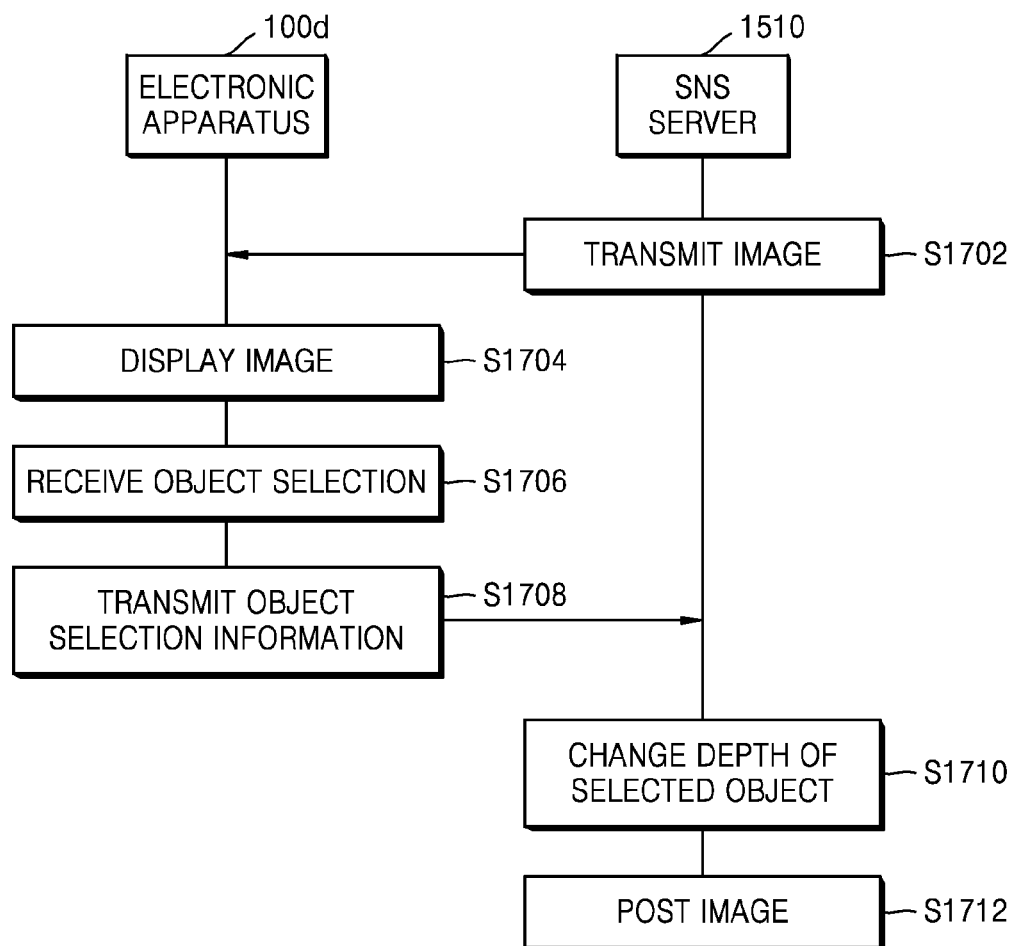
FIG. 17 is a flowchart illustrating operations of the electronic apparatus and the SNS server, according to another exemplary embodiment.

FIG. 17 is a flowchart illustrating operations of the electronic apparatus 100*d* and the SNS server 1510, according to another exemplary embodiment.

The SNS server 1510 first transmits an image stored in the SNS server 1510 to the electronic apparatus 100*d*, in operation S1702. Upon receiving the image, the electronic apparatus 100*d* displays the image in operation S1704. The electronic apparatus 100*d* receives object selection of selecting an object in operation S1706 while the image displayed, and transmits received object selection information to the SNS server 1510 in operation S1708. The SNS server 1510 receives the object selection information and changes a depth of a selected object from the image in operation S1710. Then, the SNS server 1510 posts the image in which the depth of the selected object is changed on an SNS page in operation S1712.

Figure 18:
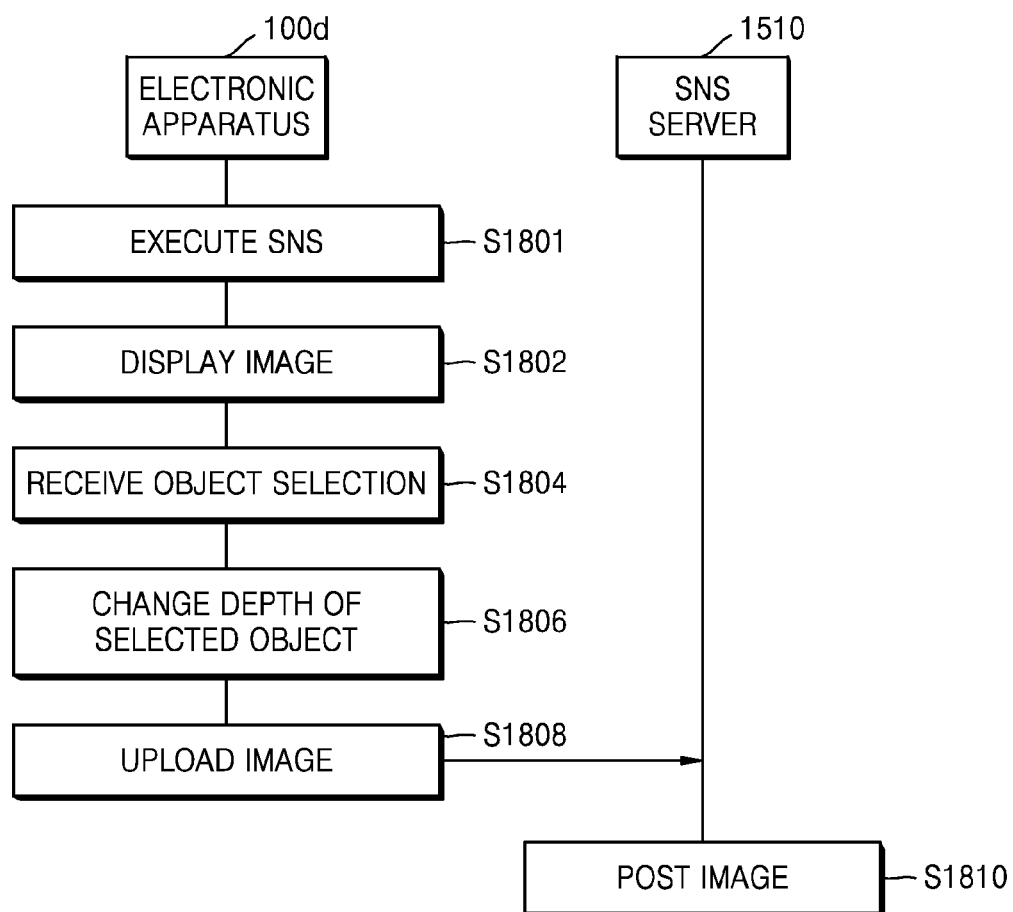
FIG. 18 is a flowchart illustrating operations of the electronic apparatus and the SNS server, according to another exemplary embodiment.

FIG. 18 is a flowchart illustrating operations of the electronic apparatus 100d and the SNS server 1510, according to another exemplary embodiment.

According to the current exemplary embodiment, the electronic apparatus 100d may execute an SNS function to change a depth of an image in the SNS function and upload the changed depth to the SNS server 1510.

First, the electronic apparatus 100d executes an SNS function, in operation S1801. The SNS function may be executed by executing an SNS application or accessing an SNS website from a web browser.

Then, the electronic apparatus 100d displays the image in the SNS function, in operation S1802. The image may be a captured image photographed by the electronic apparatus 100d or an image included in an image file stored in the storage 520 of the electronic apparatus 100d.

The electronic apparatus 100d receives object selection in operation S1804 while the image is displayed, and changes a depth of a selected object in operation S1806. Then, the electronic apparatus 100d uploads the image in which the depth of the selected object is changed on the SNS server 1510, in operation S1808.

The SNS server 1510 posts the image received from the electronic apparatus 100d on an SNS website in operation S1810.

The electronic apparatus 100d according to an exemplary embodiment transmits the image to an electronic apparatus of another user. In this case, the image processor 130 may transmit the image after changing a depth such that the other user receiving the image is emphasized in the image. For example, an image file storing the image includes region information and identification (ID) information about people in the image. When the image file is transmitted to a person included in the image, the image processor 130 may process the image such that the person receiving the image is displayed to be close. Information about the person receiving the image may be determined based on a phone number, recipient account information of a messenger service, SNS account information, or an email address according to an image transmitting method. The image processor 130 may specify an object corresponding to the person receiving the image from the image by matching ID information about objects included in the image file and information about the person receiving the image.

Figure 19:
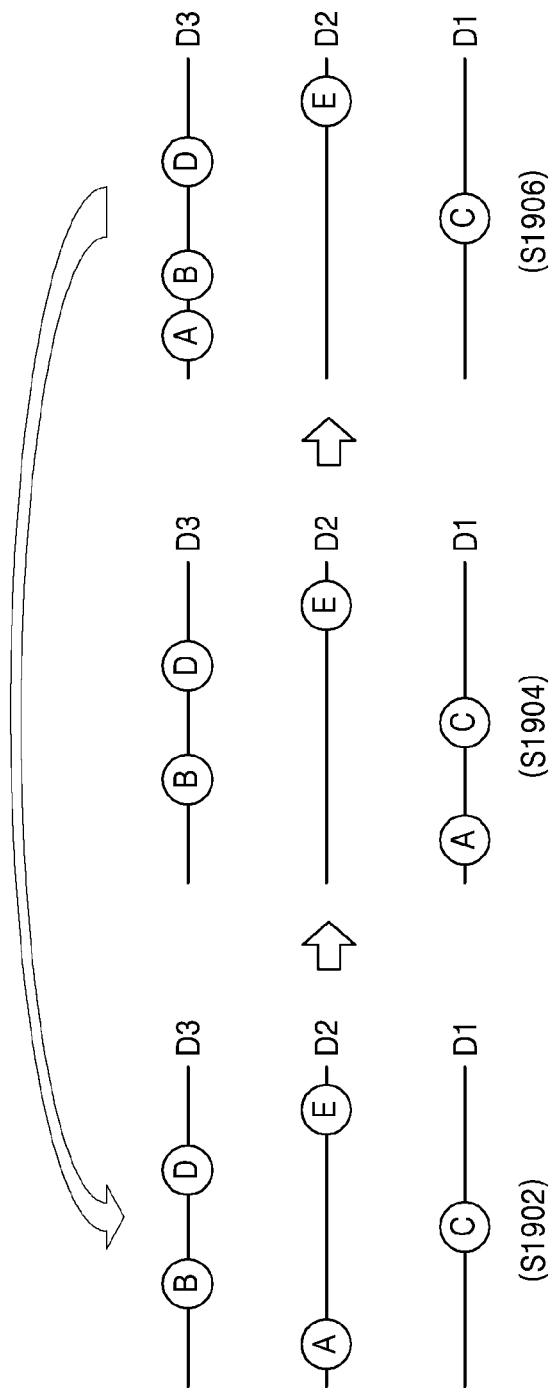
FIG. 19 is a diagram for describing object selection and a method of changing a depth of an object, according to an exemplary embodiment.

FIG. 19 is a diagram for describing object selection and a method of changing a depth of an object, according to an exemplary embodiment.

According to an exemplary embodiment, the object selection is a touch input of tapping an object displayed on an image. The image processor 130 may change a depth of a selected object in a pre-determined direction whenever a touch input of tapping an object displayed on an image is detected. For example, as shown in FIG. 19, whenever a person A is tapped, a depth of the person A may be moved closer. Also, according to the current exemplary embodiment, the depth for moving person A is selected from among depths D1 through D3, corresponding to objects displayed on the image. Accordingly, as in operation S1094, when the person A is disposed at the closest depth D1 from among depth of the objects included in the image and a tapping input of selecting the person A is detected again, the person A is moved to the farthest depth D3. If a tapping input of selecting the person A is detected again in operation S1906, the person A is moved to the depth D2 as in operation S1902.

According to another exemplary embodiment, the object selection is an input of continuously touching an object displayed on an image. In this case, while a touch input is detected, a depth of a selected object moves in one direction for a time corresponding to the touch input. For example, while the touch input is detected, operations S1902, S1904, and S1906 may be repeated.

Figure 20:
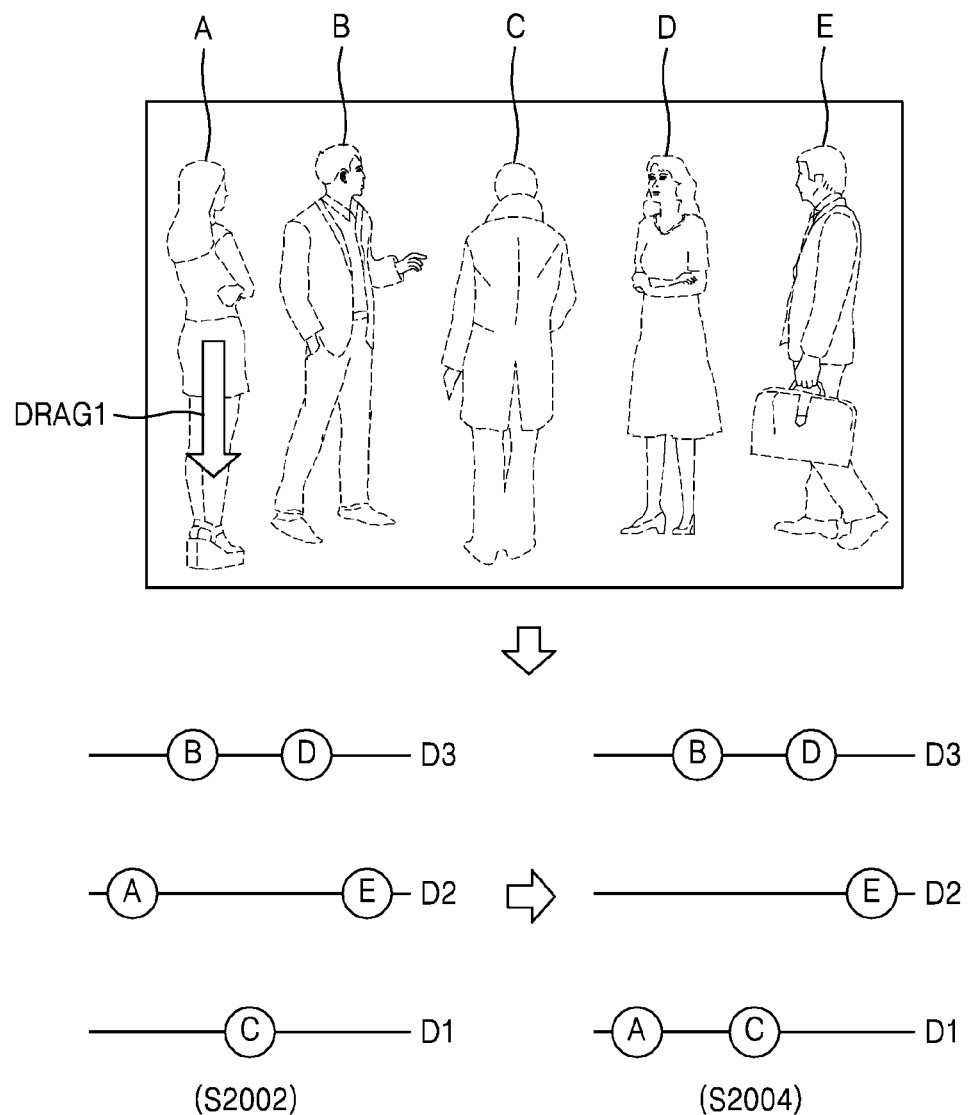
FIG. 20 is a diagram for describing object selection and a method of changing a depth of the object, according to an exemplary embodiment.

FIG. 20 is a diagram for describing object selection and a method of changing a depth of the object, according to an exemplary embodiment.

According to the current exemplary embodiment, according to a drag-touch input DRAG1 of dragging an object to be selected, a depth of the selected object is changed. For example, as shown in FIG. 20, when a person A is touched and dragged downward (DRAG1), a depth of the person A may be changed to be close.

Figure 21:
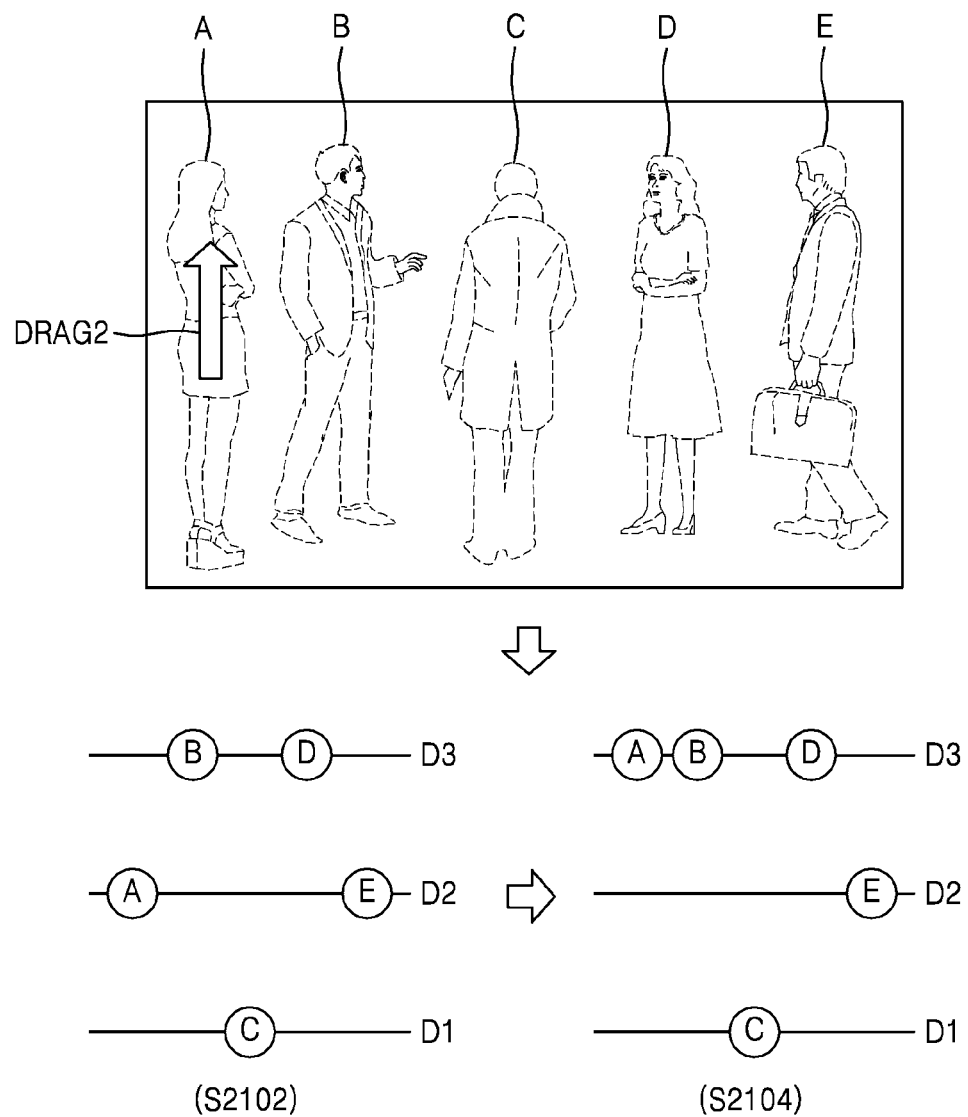
FIG. 21 is a diagram for describing object selection and a method of changing a depth of the object, according to an exemplary embodiment.

FIG. 21 is a diagram for describing object selection and a method of changing a depth of the object, according to an exemplary embodiment.

According to the current exemplary embodiment, as shown in FIG. 21, when a person A is touched and dragged upward (DRAG2), a depth of the person A may be changed to be far.

As shown in FIGS. 20 and 21, when a depth of a selected object is changed according to a drag direction by using a drag-touch input, a user may intuitively change a depth of a desired object.

Figure 22:
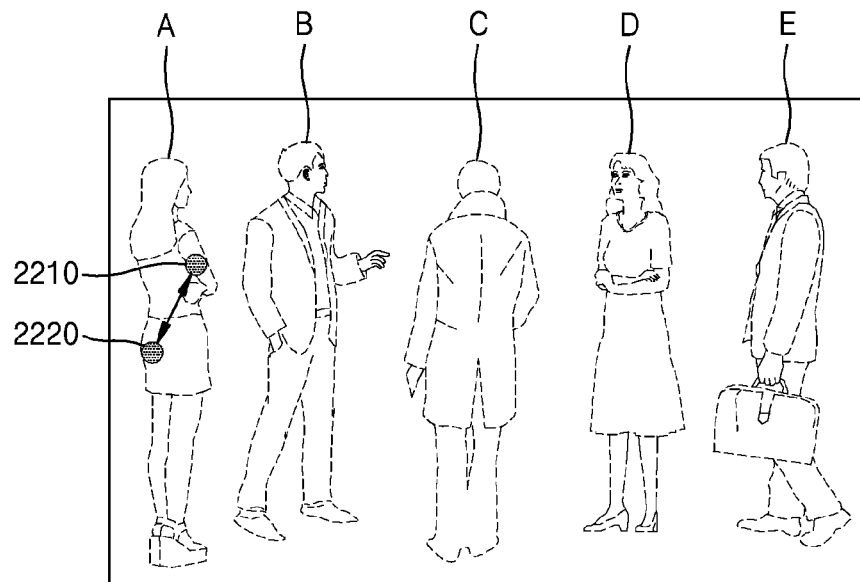
FIG. 22 is a diagram for describing object selection and a method of changing a depth of the object, according to an exemplary embodiment.

FIG. 22 is a diagram for describing object selection and a method of changing a depth of the object, according to an exemplary embodiment.

According to the current exemplary embodiment, a user may touch a desired object at two points and then decrease or increase a distance between the two points to change a depth of the desired object. For example, a region where a person A is disposed may be touched at two points 2210 and 2220, and then when touched locations are changed in a direction a distance between the two points is increased, the person A moves close, and when the touched locations are changed in a direction the distance between the two points is decreased, the person A moves far.

Figure 23:
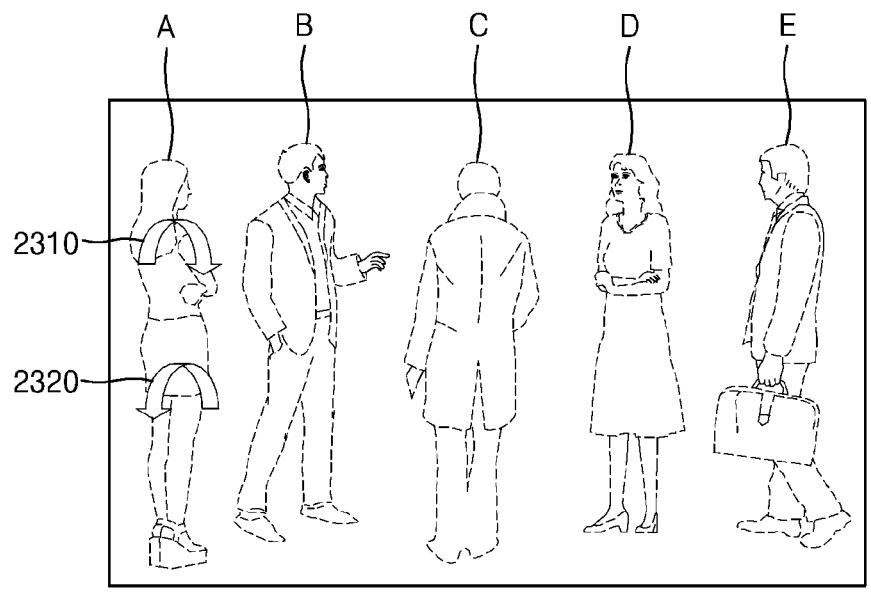
FIG. 23 is a diagram for describing object selection and a method of changing a depth of the object, according to an exemplary embodiment.

FIG. 23 is a diagram for describing object selection and a method of changing a depth of the object, according to an exemplary embodiment.

According to the current exemplary embodiment a user may move a touched location in a clockwise or counter-clockwise on a desired object to change a depth of the desired object. For example, when a touch input 2310 of rotating and moving a point where a person A is disposed in clockwise is detected, a depth of the person A is changed such that the person A is displayed close. Alternatively, when a touch input 2320 of rotating and moving a point where the person A is disposed in counterclockwise is detected, the depth of the person A is changed such that the person A is displayed far.

According to an exemplary embodiment, when object selection in a pre-determined form is detected, the image processor 130 may change a depth of a selected object to a pre-determined depth. The object selection in the pre-determined form may be, for example, a tapping-touch input or a touch input of touching an object continuously for at least reference time. For example, when a touch input of touching the person A continuously for 3 seconds is detected, the person A may be moved to a pre-determined depth D1.

Meanwhile, the present disclosure can also be embodied as computer-readable codes on a computer-readable storage medium. The computer-readable storage medium is any data storage device that can store data which can be thereafter read by a computer system.

The computer-readable codes may be configured to perform operations realizing an image processing method according to the present disclosure, when read and executed by the computer-readable storage medium from a processor. The computer-readable codes may be realized in various programming languages. Also, functional programs, codes, and code segments for accomplishing exemplary embodiments may be easily programmed by one of ordinary skill in the art.

Examples of the computer-readable storage medium include read-only memory (ROM), random-access memory (RAM), CD-ROMs, magnetic tapes, floppy disks, optical data storage devices, etc. Also, the computer-readable storage medium can also be distributed over network coupled computer systems so that the computer-readable code is stored and executed in a distributed fashion.

While exemplary embodiments have been particularly shown and described with reference to exemplary embodiments thereof, it will be understood by those of ordinary skill in the art that various changes in form and details may be made therein without departing from the spirit and scope as defined by the appended claims. The exemplary embodiments should be considered in a descriptive sense only and not for purposes of limitation. Therefore, the scope is defined not by the detailed description but by the appended claims, and all differences within the scope will be construed as being included.

The invention claimed is:

1. An image processing method comprising:
displaying an image comprising a plurality of objects;
presetting a pre-determined depth;
receiving a touch input, after the presetting of the pre-determined depth, of selecting an object from among the plurality of objects;
changing a depth of the object based on the touch input;
generating a depth adjusted image file of the image based on the changed depth; and
displaying a depth adjusted image based on the generated depth adjusted image file,
wherein the touch input of selecting the object is a touch input of touching the object from among the plurality of objects for at least a reference period of time, and the changing of the depth comprises changing the depth of the selected object to the pre-determined depth in response to the selected object being touched and maintaining a same depth of the other of the plurality of objects.

2. The image processing method of claim 1, further comprising generating a depth map comprising a plurality of depth values,
wherein the changing of the depth comprises changing one or more of the depth values of the depth map corresponding to the object.

3. The image processing method of claim 2, further comprising:
capturing the image;
generating the depth map of the image;
storing the generated depth adjusted image file; and
storing the generated depth map.

4. The image processing method of claim 2, further comprising recognizing the plurality of objects by analyzing the plurality of depth values of the depth map.

5. The image processing method of claim 1, wherein the image comprises a left-eye image and a right-eye image, and the changing of the depth comprises changing an offset value of the object from the left-eye image and the right-eye image.

6. The image processing method of claim 1, wherein the image is a moving image comprising a plurality of frames, and
the changing of the depth comprises changing the depth of the object in each of the plurality of frames.

7. The image processing method of claim 1, further comprising receiving the image from a social network service (SNS); and
uploading the depth adjusted image to the SNS.

8. The image processing method of claim 1, further comprising blurring an object having a depth different from the changed depth.

9. An electronic apparatus comprising:
a display configured to display an image comprising a plurality of objects;
a user input unit, as a touch screen, configured to receive a touch input of selecting an object from among the plurality of objects;
an image processor connected to the user input unit and configured to change a depth of the object based on the touch input, and generate a depth adjusted image file; and
a controller configured to control the display to display the image comprising the plurality of objects, recognize the object and the touch input of the object, control the image processor to change the depth of the object based on a pre-determined depth set prior to receiving the touch input, generate the depth adjusted image file, and control the display to display the depth adjusted image file,
wherein the image processor is further configured to:
in response to receiving the touch input of touching the object from among the plurality of objects for at least a reference period of time, change the depth of the selected object to the pre-determined depth in response to the selected object being touched and maintaining a same depth of the other of the plurality of objects.

10. The electronic apparatus of claim 9, wherein the controller is further configured to control the image processor to associate the image with a depth map comprising a plurality of depth values, and
control the image processor to change one or more of the depth values of the depth map corresponding to the object.

11. The electronic apparatus of claim 10, further comprising an imaging device; and
a storage configured to store the image comprising the plurality of objects,
wherein the controller is further configured to control the imaging device to capture the image, generate a depth map of the image, and store the depth adjusted image file and the generated depth map in the storage.

12. The electronic apparatus of claim 10, wherein the controller is further configured to control the image processor to recognize the plurality of objects by analyzing the plurality of depth values of the depth map.

13. The electronic apparatus of claim 9, wherein the image comprises a left-eye image and a right-eye image, and
the controller is further configured to control the image processor to change an offset value of the object from the left-eye image and the right-eye image.

14. The electronic apparatus of claim 9, wherein the image is an anaglyph image, and the controller is further configured to control the image processor to change an offset value of the object from the image.

15. The electronic apparatus of claim 9, wherein the image is a moving image comprising a plurality of frames, and
the controller is further configured to control the image processor to change the depth in each of the plurality of frames.

16. The electronic apparatus of claim 9, further comprising a communicator configured to communicate with a server of a social network service (SNS),
wherein the controller is further configured to control the communicator to upload the depth adjusted image to the server.

17. The electronic apparatus of claim 9, wherein the controller is further configured to control the image processor to blur an object having a depth different from the changed depth.

18. A non-transitory computer-readable recording medium having recorded thereon a program for executing an image processing method comprising:

displaying an image comprising a plurality of objects;

presetting a pre-determined depth;

receiving a touch input, after the presetting of the predetermined depth, of selecting an object from among the plurality of objects;

changing a depth of the object based on the touch input;

generating a depth adjusted image file of the image based on the changed depth; and displaying a depth adjusted image based on the generated depth adjusted image file, wherein the touch input of selecting the object is a touch input of touching the object from among the plurality of objects for at least a reference period of time, and the changing of the depth comprises changing the depth of the selected object to the pre-determined depth in response to the selected object being touched and maintaining a same depth of the other of the plurality of objects.

* * * * *